(12) United States Patent
Poncelet et al.

(10) Patent No.: US 11,594,344 B2
(45) Date of Patent: Feb. 28, 2023

(54) METHOD FOR PREPARING A POWDER COMPRISING PARTICLES OF TRIURANIUM OCTOXIDE AND PARTICLES OF PLUTONIUM DIOXIDE

(71) Applicants: ORANO CYCLE, Courbevoie (FR); COMMISSARIAT À L'ÉNERGIE ATOMIQUE ET AUX ÉNERGIES ALTERNATIVES, Paris (FR)

(72) Inventors: François Poncelet, Le Vesinet (FR); Nicolas Vigier, Montevrain (FR); Bénédicte Arab-Chapelet, Bagnols sur Ceze (FR); Aurélie Gauthe, Avignon (FR); Eléonore Welcomme, Vedene (FR); Marie Hélène Noire, Sauveterre (FR)

(73) Assignees: COMMISSARIAT À L'ÉNERGIE ATOMIQUE ET AUX ÉNERGIES ALTERNATIVES, Paris (FR); ORANO RECYCLAGE, Châtillon (FR)

( * ) Notice: Subject to any disclaimer, the term of this patent is extended or adjusted under 35 U.S.C. 154(b) by 462 days.

(21) Appl. No.: 16/770,836

(22) PCT Filed: Dec. 7, 2018

(86) PCT No.: PCT/EP2018/083998
§ 371 (c)(1),
(2) Date: Jun. 8, 2020

(87) PCT Pub. No.: WO2019/115394
PCT Pub. Date: Jun. 20, 2019

(65) Prior Publication Data
US 2021/0166826 A1 Jun. 3, 2021

(30) Foreign Application Priority Data

Dec. 11, 2017 (FR) ........................................ 1761947
Apr. 23, 2018 (CN) ........................ 201810367647.6

(51) Int. Cl.
*G21C 19/46* (2006.01)
*C01G 43/01* (2006.01)
(Continued)

(52) U.S. Cl.
CPC ............. *G21C 19/46* (2013.01); *C01G 43/01* (2013.01); *C01G 56/005* (2013.01);
(Continued)

(58) Field of Classification Search
CPC .......... G21C 19/46; G21C 3/623; G21C 3/62; C01G 43/01; C01G 56/005; C01G 56/007;
(Continued)

(56) References Cited

U.S. PATENT DOCUMENTS

2010/0301287 A1* 12/2010 Johnson ................. G21C 19/46
252/635

FOREIGN PATENT DOCUMENTS

GB         978615      * 8/1961
GB         978615 A   12/1964
(Continued)

OTHER PUBLICATIONS

Koizumi et al. (Development of a Process for Co-Conversion of PuU Nitrate Mixed Solutions to Mixed Oxide Powder Using Microwave Heating Method, Journal of Nuclear Science and Technology, 2012) (Year: 2012).*
Caldwell (Relationship Between Process Variables and Final Properties of Ceramic-Grade UO2, UO2—PuO2, and PuO2, Oak Ridge National Labratory, 1961) (Year: 1961).*
(Continued)

*Primary Examiner* — Anthony J Zimmer
*Assistant Examiner* — Logan Edward Laclair
(74) *Attorney, Agent, or Firm* — Pearne & Gordon LLP

(57) ABSTRACT

A method for preparing a powder comprising an intimate mixture of $U_3O_8$ particles and $PuO_2$ particles and which may further comprise particles of $ThO_2$ or $NpO_2$. The method comprises: preparing, via oxalic precipitations, an aqueous suspension $S_1$ of particles of uranium(IV) oxalate and an aqueous suspension $S_2$ of particles of plutonium(IV) oxalate; mixing the aqueous suspension $S_1$ with the aqueous suspension $S_2$ to obtain an aqueous suspension $S_{1+2}$; sepa-
(Continued)

rating the aqueous suspension $S_{1+2}$ into an aqueous phase and a solid phase comprising the particles of uranium(IV) oxalate and the particles of plutonium(IV) oxalate; and calcining the solid phase to convert (1) the particles of uranium(IV) oxalate to particles of triuranium octoxide and (2) the particles of plutonium(IV) oxalate to particles of plutonium(IV) dioxide, whereby the powder is obtained.

12 Claims, 4 Drawing Sheets

(51) Int. Cl.
*C01G 56/00* (2006.01)
*G21C 3/62* (2006.01)

(52) U.S. Cl.
CPC ............ *C01G 56/007* (2013.01); *G21C 3/623* (2013.01); *C01P 2002/72* (2013.01); *C01P 2004/03* (2013.01); *C01P 2004/51* (2013.01); *C01P 2006/12* (2013.01)

(58) Field of Classification Search
CPC .............. C01P 2002/72; C01P 2004/03; C01P 2004/51; C01P 2006/12; Y02E 30/30; Y02W 30/50
See application file for complete search history.

(56) References Cited

FOREIGN PATENT DOCUMENTS

| WO | 02-28778 A1 | 4/2002 |
| WO | 2005/119699 A1 | 12/2005 |
| WO | 2007/135178 A1 | 11/2007 |
| WO | 2010/070064 A1 | 6/2010 |

OTHER PUBLICATIONS

International Search Report for PCT/EP2018/083998 dated Feb. 12, 2019.
Written Opinion for PCT/EP2018/083998 dated Feb. 12, 2019.
Search Report for French application No. FR1761947 dated Aug. 9, 2018.
Numao, O.T. et al, "Results of Active Test of Uranium-Plutonium Co-denitration Facility at Rokkasho Reprocessing Plant" In: Global 2007: Advance Nuclear Fuel Cycles and Systems, Sep. 13, 2007, pp. 238-244.
Felker, L.K. et al. "Product Conversion: The Link Between Separations and Fuel Fabrication" In: Atalante 2008: Nuclear Fuel Cycles for a Sustainable Future, May 2008, pp. 19-23.
Delegard C.H., "Critical Mass Laboratory Solutions Precipitation, Calcination, and Moisture Uptake Invenstigations" In: PNNL-13934, 2002.
Altas Y. et al. "Preparation of homogeneous $(Th_{0-8}U_{0-2})O_2$ powders by mechanical blending of $TH(C_0O_4)_2 \cdot 6H_2O$ and $U(C_2O_4)_2 \cdot 6H_2O$ powders" In: Journal of Nuclear Materials 294, 2001, pp. 344-348.

\* cited by examiner

METHOD FOR PREPARING A POWDER COMPRISING PARTICLES OF TRIURANIUM OCTOXIDE AND PARTICLES OF PLUTONIUM DIOXIDE

CROSS-REFERENCE TO RELATED APPLICATIONS

This is a National Stage application of PCT international application PCT/EP2018/083998, filed on Dec. 7, 2018, which claims the priority of French Patent Application No. 1761947, filed Dec. 11, 2017 and Chinese Patent Application No. 201810367647.6 filed Apr. 23, 2018, all of which are incorporated herein by reference in their entirety.

TECHNICAL FIELD

The invention is directed towards the field of recycling spent nuclear fuels.

More specifically the invention relates to a method allowing the preparation of a powder comprising an intimate mixture of particles of triuranium octoxide $U_3O_8$ and particles of plutonium dioxide $PuO_2$, which additionally may comprise particles of a tetravalent actinide dioxide selected from among thorium and neptunium, using aqueous flows resulting from hydrometallurgical processing of spent nuclear fuels.

The powder obtained may notably find application in the production of fresh nuclear fuels of MOX type (Mixed OXide Fuel) able to be irradiated for example in light water reactors (LWRs) or fast neutron reactors (FNRs).

STATE OF THE PRIOR ART

At the current tine, the processing/recycling of spent nuclear fuels for reuse of the plutonium contained therein, and for production of a fuel of MOX type notably comprises the following steps:

1. dissolution of the spent nuclear fuels in nitric acid, to solubilise the different actinides and fission products present in these fuels;
2. separation/purification of the uranium and plutonium to obtain two aqueous flows, one comprising purified uranium (VI) and the other comprising purified plutonium(IV);
3. converting the uranium and plutonium present in these aqueous flows into two separate solid phases of $UO_2$ and $PuO_2$ dioxide type; and
4. producing pellets of MOX fuel via a process successively comprising the steps of mixing/pressing/sintering $UO_2$ and $PuO_2$ dioxides, with the mixture that may optionally be completed with chamotte (rejects of pellet production).

One envisaged route to reinforce resistance of the nuclear fuel cycle against the risk of misappropriation of plutonium for unlawful purposes is to limit as much as possible the number of steps using purified plutonium alone, in particular at the step to convert the aqueous flows comprising uranium (VI) and plutonium(IV) in nitrate form to dioxides, as described in International application PCT WO 2007/13517, hereafter reference [1].

Several methods have been proposed for the co-management of uranium and plutonium, specifically based on obtaining a stable aqueous solution of uranium(VI) and plutonium(IV) upstream of the conversion step. The conversion of uranium(VI) and plutonium(IV) present in this aqueous solution is intended to obtain a mixed oxide powder $(U,Pu)O_2$ or, more often, a powder formed of intimately mixed particles of $UO_2$ and $PuO_2$ as end product. The chief difference between the different conversions that have been developed on pilot or industrial scale lies at the step to convert the actinides, that are in solution, to a solid phase. This step is based either on a method of thermal denitration type or on a method of precipitation/calcination type.

In respect of thermal denitration methods for uranium/plutonium co-management, mention can be made of the methods described by Numao et al. (GLOBAL 2007: Advanced Nuclear Fuel Cycles and Systems, Boise, USA, 9-13 Sep. 2007, hereafter reference [2]) and by Felker et al. (ATALANTE 2008: Nuclear Fuel Cycles for a Sustainable Future, Montpellier, France, 19-23 May 2008, hereafter reference [3]).

These methods are, in general, relatively compact but they require a strong upstream concentration of the aqueous actinide solutions. In addition, the characteristics of the oxide powders produced are difficult to control for a direct application, and require the recourse to multiple processings (milling, granulation, . . . ) before shaping the fuel.

With regard to methods using precipitation/calcination for the uranium/plutonium co-management, three types are encountered:

those having recourse to a co-precipitation of uranium and plutonium in the form of ammonium double carbonates;
those having recourse to an ammoniacal co-precipitation;
those having recourse to an oxalic co-precipitation.

The co-precipitation of uranium and plutonium in the form of ammonium double carbonates can only be applied to hexavalent actinides. On this account, it requires a difficult step of valence adjustment of plutonium(IV) to plutonium(VI). In addition, the co-precipitation reaction is not quantitative owing to the non-negligible solubility of ammonium double carbonates in an aqueous medium, leading to low yields.

The ammoniacal co-precipitation has a major disadvantage in that the management of ammonium nitrate effluents is problematic.

The oxalic co-precipitation is based either on a co-precipitation of actinides to oxidation state IV only, as described in International application PCT WO 02/28778, hereafter reference [4], or on a co-precipitation of actinides to oxidation states III and IV, as described in International application PCT WO 2005/119699, hereafter reference [5].

For oxalic co-precipitation of actinides to oxidation state IV only, the challenge is to hold uranium and plutonium jointly in oxidation state IV although uranium IV is a powerful reductant of plutonium(IV) in an aqueous medium. The addition of one or more strong complexing agents, able to stabilise these two metal cations at oxidation state IV until oxalic co-precipitation, is therefore necessary. This stabilisation, although efficient, limits operating margins of the method, in particular in terms of control over pH. In addition, this method entails the adding of the complexing agent(s) in large amounts to the aqueous solution, with the concomitant addition of a base, e.g. sodium hydroxide or ammonia. This results in a complex managing of the generated effluents.

Regarding oxalic co-precipitation of actinides to oxidation states III and IV, this allows quantitative precipitation of these actinides and leads to a mixed oxide of solid solution type (reference [5]). However, it has recourse to a potentially problematic step of reducing plutonium(IV) to plutonium (III) and of stabilising the latter. In addition, the maximum attainable Pu/(U+Pu) ratio is limited to about 50 atomic % on account of the phase diagram of the mixed oxalate obtained, of hexagonal shape.

In a different application framework, an oxalic precipitation of uranium(VI) and plutonium(IV) in aqueous solution was described by Delegard et al. (PNNL-13934, 2002, hereafter reference [6]) to separate uranium from plutonium by making use of the high aqueous solubility of uranium(VI) oxalate compared with the low aqueous solubility of plutonium(IV).

Finally the use can be noted, derived from the oxalic co-precipitation of uranium(IV) and thorium(IV), to prepare a powder of a mixed oxide $(U,Th)O_2$ (Atlas et al., *Journal of Nuclear Materials*, 2001, 294, 344-348, hereafter reference [7]).

Having regard to the foregoing, the inventors therefore set themselves the objective of providing a method for converting uranium and plutonium which allows both an extension of operating margins for this conversion and simplified implementation.

As part of their research, the inventors have ascertained, against all expectations, that it is possible to obtain an aqueous suspension which, although comprising particles of both uranium(IV) oxalate and plutonium(IV) oxalate, is stable and homogeneous, thereby overcoming a certain number of operating restrictions encountered up until now for the co-conversion of uranium and plutonium.

The invention is based on this surprising experimental finding.

DESCRIPTION OF THE INVENTION

The subject of the invention is therefore a method for preparing a powder comprising particles of triuranium octoxide $U_3O_8$ and particles of plutonium dioxide $PuO_2$, which comprises:

a) preparing, via oxalic precipitations, an aqueous suspension $S_1$ of particles of uranium(IV) oxalate and an aqueous suspension $S_2$ of particles of plutonium(IV) oxalate;

b) mixing the aqueous suspension $S_1$ with the aqueous suspension $S_2$ to obtain an aqueous suspension $S_{1+2}$ comprising particles of uranium(IV) oxalate and particles of plutonium(IV) oxalate;

c) separating the aqueous suspension $S_{1+2}$ into an aqueous phase and a solid phase comprising the particles of uranium(IV) oxalate and the particles of plutonium(IV) oxalate; and d) calcining the solid phase to convert (1) the particles of uranium(IV) oxalate to particles of triuranium octoxide and (2) the particles of plutonium(IV) oxalate to particles of plutonium dioxide, whereby the powder is obtained;

and wherein steps b) and c) are performed simultaneously or successively.

According to the invention, step a) preferably comprises:
placing an aqueous solution $A_1$ comprising nitric acid and uranium(IV) nitrate, or uranous nitrate, in contact with an aqueous solution $A_2$ comprising a precipitating agent selected from among oxalic acid, salts thereof (e.g. ammonium oxalate) and alkylated derivatives thereof (e.g. dimethyl oxalate) to form a reaction medium in which uranium(IV) is precipitated in the form of uranium(IV) oxalate; and placing an aqueous solution $A'_1$ comprising nitric acid and plutonium(IV) nitrate, in contact with an aqueous solution $A'_2$ comprising a precipitating agent selected from among oxalic acid, salts and alkylated derivatives thereof to form a reaction medium in which plutonium (IV) is precipitated in the form of plutonium(IV) oxalate.

The aqueous solutions $A_1$ and $A'_1$ preferably comprise from 0.5 mol/L to 5 mol/L of nitric acid.

In the invention, the concentration of uranium(IV) in the aqueous solution $A_1$ and the concentration of plutonium(IV) in the aqueous solution $A'_1$ may vary within broad limits, but preferably these concentrations are between 0.001 mol/L and 1 mol/L.

The concentration of the precipitating agent in the aqueous solutions $A_2$ and $A'_2$ is typically between 0.05 mol/L and 1 mol/L.

This concentration is preferably chosen so that, having regard to the volume ratios of aqueous solutions $A_1$ and $A'_1$ respectively to the aqueous solutions $A_2$ and $A'_2$ respectively, that are used for the contacting of these solutions, the precipitating agent is present in the reaction media in excess with regard to the stoichiometric conditions for the oxalic precipitations of uranium(IV) and plutonium(IV).

Typically, this excess is determined so that a residual concentration of oxalate ions ranging from 0.01 mol/L to 0.5 mol/L is obtained in the reaction media at the end of the oxalic precipitations.

At step a), the reaction media are preferably held at a temperature ranging from 10° C. to 60° C. throughout the entire duration of the oxalic precipitations.

In the invention, the aqueous solution $A_1$ may additionally comprise a compound capable of stabilising uranium at its oxidation state IV and preventing therefore an oxidation thereof to uranium(VI) by some compounds present in the reaction medium (nitric acid, nitrous acid, . . . ) or by the surrounding atmosphere (e.g. dioxygen of ambient air).

This stabilising compound is preferably a compound which releases a monocharged cation only comprising atoms of carbon, hydrogen, oxygen and/or nitrogen (CHON cation) in an aqueous solution. For example, said compound is an anti-nitrous agent such as a hydrazinium salt or alkylhydrazinium salt that is preferably used at a concentration of between 0.05 mol/L and 0.2 mol/L.

Also, the aqueous solution $A'_1$ may additionally comprise uranium(VI) nitrate or uranyl nitrate, in which case the concentration of this nitrate in solution $A'_1$ is typically between 0.001 mol/L and 0.05 mol/L.

To guarantee a stability of the chemical precipitation conditions, in terms of free nitric acidity and oxalic excess, and thereby a stable homogeneous particle size distribution of the uranium(IV) oxalate and plutonium(IV) oxalate particles, step a) preferably comprises:

adding the aqueous solutions $A_1$ and $A_2$ to a third aqueous solution comprising nitric acid and a precipitating agent identical to the precipitating agent of the aqueous solution $A_2$; and adding the aqueous solutions $A'_1$ and $A'_2$ to a fourth aqueous solution comprising nitric acid and a precipitating agent identical to the precipitating agent of the aqueous solution $A'_2$.

In this case, if a uranium(IV) stabilising agent is present in the solution $A_1$, then this stabilising agent is preferably also present in the third aqueous solution. Similarly, if uranium(VI) nitrate is present in the aqueous solution $A'_1$, then uranium(VI) nitrate is preferably also present in the fourth aqueous solution.

The preparation of the aqueous suspensions $S_1$ and $S_2$ can be conducted in any type of reactor lending itself to the precipitation of actinides, for example a vortex effect reactor of the type employed in the nuclear industry, or a fluidised bed reactor such as described in International application PCT WO 2010/070064, hereafter reference [8].

According to the invention, step b), corresponding to the mixing of the aqueous suspension $S_1$ with the aqueous suspension $S_2$, can be performed using any technique allowing a close contacting of these aqueous suspensions and hence of the oxalate particles contained therein, and similarly step c) corresponding to the separation of the aqueous suspension $S_{1+2}$ obtained at step b) into an aqueous phase and a solid phase can be performed using any solid-liquid separation technique, e.g. by filtration in particular vacuum or pressure filtration, or by centrifugation.

Steps b) and c) are preferably carried out simultaneously and, if this is not the case, then step c) is preferably performed within a maximum time of 10 hours after step b).

Whichever the case, having regard to the similarity in the morphological and structural characteristics of uranium(IV) oxalate and plutonium(IV) oxalate, the mixing of the particles of these oxalates occurs easily and homogeneously. This homogeneity is subsequently found in the distribution of the uranium(IV) oxalate particles and plutonium(IV) oxalate particles in the solid phase obtained at the end of step c). As a result, any later segregation of the uranium and plutonium solids becomes near-impossible.

The calcination of the solid phase obtained at the end of step c) is preferably conducted at a temperature of at least 550° C. and advantageously at no more than 1 250° C. and in an oxidizing atmosphere, e.g. in air or a mixture of dioxygen and dinitrogen.

A powder is thereby obtained comprising an intimate, homogeneous mix of triuranium octoxide particles and plutonium dioxide particles, the homogeneity obtained at steps b) and c) being maintained in the mix of uranium and plutonium oxides produced at step d).

As previously indicated, the method of the invention also allows the preparation of a powder comprising, in addition to the particles of triuranium octoxide and plutonium dioxide, particles of an actinide(IV) dioxide selected from among thorium and neptunium.

For doing that, there are two manners in which to proceed:
either an aqueous suspension $S_3$ of the actinide(IV) particles is prepared, which is then mixed with the aqueous suspensions $S_1$ and $S_2$;
or an actinide(IV) nitrate is added to the aqueous solution $A_1$ comprising uranium(IV) nitrate, in which case an aqueous suspension $S_1$ is obtained comprising a uranium(IV) and actinide (IV) double oxalate that is then mixed with the aqueous suspension $S_2$.

In the first manner of proceeding, the method therefore comprises:
a') preparing, via oxalic precipitations, the aqueous suspension $S_1$ of particles of uranium(IV) oxalate, the aqueous suspension $S_2$ of particles of plutonium(IV) oxalate and an aqueous suspension $S_3$ of particles of actinide(IV) oxalate;

b') mixing the aqueous suspensions $S_1$, $S_2$ and $S_3$ with each other to obtain an aqueous suspension $S_{1+2+3}$ comprising particles of uranium(IV) oxalate, particles of plutonium (IV) oxalate and particles of actinide(IV) oxalate;

c') separating the aqueous suspension $S_{1+2+3}$ into an aqueous phase and a solid phase comprising the particles of uranium(IV) oxalate, the particles of plutonium(IV) oxalate and the particles of actinide(IV) oxalate; and d') calcining the solid phase to convert the particles of uranium(IV) oxalate to particles of triuranium octoxide, the particles of plutonium(IV) oxalate to particles of plutonium dioxide and the particles of actinide(IV) oxalate to particles of actinide(IV) dioxide;

steps b') and c') being performed simultaneously or successively.

In which case, the aqueous suspension of actinide(IV) oxalate particles is prepared following the same modalities as those previously described for the preparation of the aqueous suspensions $S_1$ and $S_2$ but using an aqueous solution of a nitrate of this actinide(IV) in lieu and stead of the aqueous solutions $A_1$ and $A'_1$.

Also, steps b'), c') and d') are performed following the same modalities as those previously described to conduct steps b), c) and d).

For the second manner of proceeding, the method comprises:
a") preparing, via oxalic precipitations, an aqueous suspension $S_1$ of uranium(IV) and actinide(IV) double oxalate particles, and the aqueous suspension $S_2$ of plutonium(IV) oxalate particles;

b") mixing the aqueous suspension $S_1$ with the aqueous suspension $S_2$ to obtain an aqueous suspension $S_{1+2}$ comprising uranium(IV) and actinide(IV) double oxalate particles and particles of plutonium(IV) oxalate;

c") separating the aqueous suspension $S_{1+2}$ into an aqueous phase and a solid phase formed by the uranium(IV) and actinide(IV) double oxalate particles and the particles of plutonium(IV) oxalate; and d") calcining the solid phase to convert (1) the uranium (IV) and actinide(IV) double oxalate particles to particles of triuranium octoxide and actinide(IV) dioxide, and (2) the plutonium(IV) oxalate particles to particles of plutonium dioxide, whereby the powder is obtained;
steps b") and c") being performed simultaneously or successively.

In which case, the aqueous suspension $S_1$ is prepared following the same modalities as those previously described to prepare the aqueous suspension $S_1$, but using an aqueous solution in which a portion of the uranium(IV) nitrate is replaced by an actinide(IV) nitrate.

In addition, steps b"), c") and d") are also performed following the same modalities as those previously described to perform steps b), c) and d).

Aside from the advantages already cited, the method of the invention affords the following advantages.

Since uranium(IV) and plutonium(IV) are placed in contact with each other only when mixing the aqueous suspensions $S_1$ and $S_2$, the risk of a redox reaction between uranium and plutonium is avoided. This prevents the risk of a change in the oxidation state of these cations: reduction of plutonium(IV) to plutonium(III) and oxidation of uranium(IV) to uranium(VI), which could make it impossible for uranium to be precipitated quantitatively.

Also, the method of the invention allows the production of powders of uranium and plutonium oxides having a plutonium content that may vary over a wide range: from more than 10% to more than 50 atomic %.

It also allows adjustment of the Pu/(U+Pu) ratio of the powders of uranium and plutonium oxides produced to a desired ratio, by acting either on the concentrations of uranium(IV) and plutonium(IV) respectively in the solutions $A_1$ and $A'_1$ used for the oxalic precipitations, or on the proportions in which the aqueous suspensions $S_1$ and $S_2$ are mixed with each other. Since the solubilities in an aqueous medium of the actinide(IV) oxalates, and more particularly those of the uranium(IV) and plutonium(IV) oxalates, are similar and very low under the operating conditions of the method of the invention, the oxalic precipitations are quantitative (with a yield higher than 99%) for all the actinides (IV). Therefore, the conversion to oxalates of uranium(IV)

and plutonium(IV) respectively present in the aqueous solutions $A_1$ and $A'_1$ has no impact on the content of these elements in the powders of uranium and plutonium oxides produced.

With the method of the invention, it is therefore possible to prepare oxide powders that from the outset have the targeted plutonium content for the fabrication of a nuclear fuel, e.g. 10 to 30 atomic % for a MOX fuel, as well as to prepare master oxide powders having a plutonium content higher than 50 atomic % that will subsequently be diluted with a uranium oxide powder to adjust the plutonium content to the desired value for the fabrication of a nuclear fuel.

The method of the invention also allows easy incorporation of a thorium or neptunium oxide in the powders of uranium and plutonium oxides that are produced, here again with the possibility to adjust the content of this oxide in these powders. It hence allows an increase in the amount of the elements of the spent nuclear fuels that can be recycled and thereby a reduction in the radiotoxicity of the end wastes from the processing of spent nuclear fuels.

It further provides the advantage of being able to be implemented both downstream of a method for processing spent nuclear fuels which is aimed at managing separately the purification of uranium and the purification of plutonium and which therefore leads to obtaining two aqueous flows, one comprising purified uranium and the other purified plutonium—as is the case in the PUREX method—, and downstream of a method for processing spent nuclear fuels in which a co-management of uranium and plutonium is ensured at the purification steps.

Finally, the method of the invention has the advantage of a particularly simplified management of the residual aqueous effluents chiefly formed of nitric acid and containing a moderate amount of precipitating agent, without any other addition of pH controlling agent and/or complexing agent which could prove to be penalising in terms of complexity of management and final conditioning.

Other characteristics and advantages of the invention will become apparent on reading the remainder of the description below, relating to one example of embodiment of the invention and referring to the appended Figures.

Evidently, this example is only given for the purpose of illustrating the invention and it is not in any manner limiting thereof.

EXAMPLE OF EMBODIMENT OF THE METHOD OF THE INVENTION

This example relates to the preparation of a powder composed of a mixture of $U_3O_8$ particles and $PuO_2$ particles, from an aqueous solution $A_1$ of uranium(IV) nitrate and an aqueous solution $A'_1$ of plutonium(IV) nitrate and uranium(VI) nitrate.

The aqueous solution $A_1$ comprises 0.15 mol/L of uranium(IV) nitrate or uranous nitrate, of formula $U(NO_3)_4$, 2.5 mol/L of nitric acid and 0.06 mol/L of hydrazinium ions $N_2H_5^+$ (supplied in the form of hydrazinium nitrate $N_2H_5NO_3$), whilst the aqueous solution $A'_1$ comprises 0.15 mol/L of plutonium(IV) nitrate of formula $Pu(NO_3)_4$, 0.038 mol/L of uranium(VI) nitrate or uranyl nitrate, of formula $UO_2(NO_3)_2$, and 2.5 mol/L of nitric acid.

The concentration of uranium(IV) nitrate in the aqueous solution $A_1$ and the concentration of plutonium(IV) nitrate in the aqueous solution $A'_1$ are selected so that, having regard to the volumes of the aqueous solutions involved, the initial Pu(IV)/U(IV)+Pu(IV) molar ratio is 0.45.

1. Preparation of the Powder:

In the invention, the preparation of the powder of $U_3O_8$ and $PuO_2$ successively comprises:

preparing, via oxalic precipitations, an aqueous suspension $S_1$ of particles of uranium(IV) oxalate of formula $U(C_2O_4)_2 \cdot 6H_2O$, and an aqueous suspension $S_2$ of particles of plutonium(IV) oxalate of formula $Pu(C_2O_4)_2 \cdot 6H_2O$;

mixing the aqueous suspensions $S_1$ and $S_2$ to obtain an aqueous suspension $S_{1+2}$ comprising both particles of uranium(IV) oxalate and particles of plutonium(IV) oxalate;

separating suspension $S_{1+2}$ thus obtained into an aqueous phase and a solid phase that is formed of the particles of uranium(IV) oxalate and the particles of plutonium (IV) oxalate; and calcining the solid phase thus obtained to convert, on the one hand, the particles of uranium(IV) oxalate to particles of $U_3O_8$ and, on the other hand, the particles of plutonium(IV) oxalate to particles of $PuO_2$.

Figure 1:
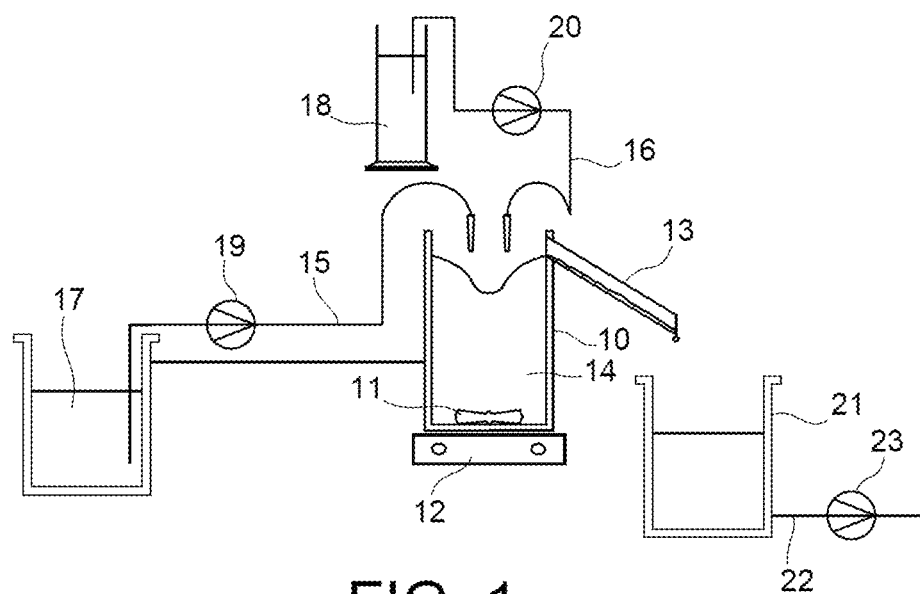
FIG. 1 is a flow diagram of the assembly used to prepare an aqueous suspension $S_1$ of uranium(IV) oxalate particles and an aqueous suspension $S_2$ of plutonium(IV) oxalate particles in the example of embodiment of the method of the invention described below.

Preparation of the Aqueous Suspensions $S_1$ and $S_2$:

As illustrated in FIG. 1, the aqueous suspension $S_1$ of particles of uranium(IV) oxalate is prepared in a reactor 10, which is equipped with an agitation system 11, 12 and an overflow 13, and which initially contains an aqueous solution 14 comprising 0.05 mol/L of oxalic acid, 0.039 mol/L of hydrazinium ions (also provided in the form of hydrazinium nitrate) and 2 mol/L of nitric acid.

The reactor 10, via inlets 15 and 16 respectively, is charged with the aqueous solution $A_1$, referenced 17 in FIG. 1, and with the aqueous solution $A_2$, referenced 18 in FIG. 1, which comprises 0.7 mol/L of oxalic acid.

The addition rates of the aqueous solutions $A_1$ and $A_2$ to the reactor 10 are regulated by means of pumps, 19 and 20 respectively, each equipped with a flowmeter, and are 21.7 mL/min for the aqueous solution $A_1$ and 11.7 mL/min for the aqueous solution $A_2$, leading to an excess of oxalic acid with regard to the stoichiometric conditions for the oxalic precipitation of uranium(IV).

The adding of the aqueous solutions $A_1$ and $A_2$ to the reactor 10 leads to the formation of a reaction medium in which uranium(IV) is precipitated in the form of particles of uranium(IV) oxalate that are discharged via the overflow 13 into a receptacle positioned below the free end of this overflow. The aqueous suspension $S_1$ thus formed is then evacuated from the receptacle via a line 22 equipped with a pump 23.

To prepare the aqueous suspension $S_2$ of particles of plutonium(IV) oxalate, an aqueous solution $A'_2$ is used having a composition identical to that of the aqueous solution $A_2$ previously used, and an assembly similar to the one illustrated in FIG. 1 with the exception that:

first, the aqueous solution 14 initially contained in the reactor 10 is replaced by an aqueous solution comprising 0.05 mol/L of oxalic acid, 0.02 mol/L of uranium (VI) and 2 mol/L of nitric acid; and secondly, the aqueous solution $A_1$ is replaced by the aqueous solution $A'_1$.

The flow rate conditions are the same as those previously described for the preparation of the aqueous suspension $S_1$ of particles of uranium(IV) oxalate.

Figure 2:
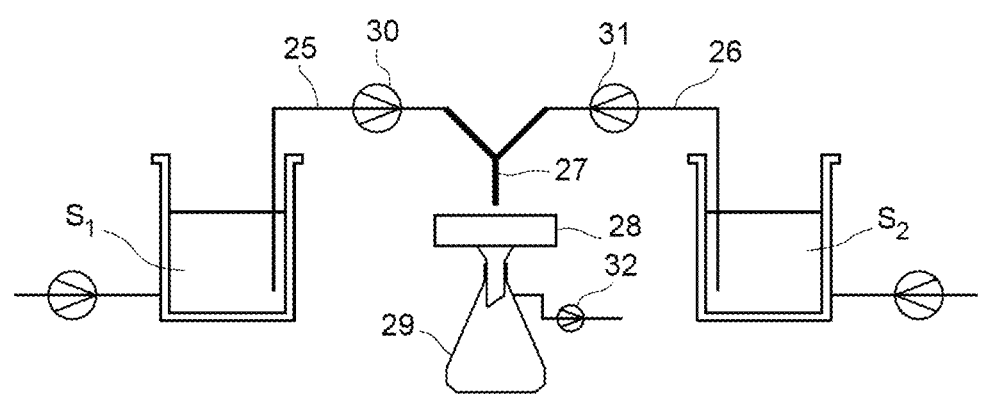
FIG. 2 is a flow diagram of the assembly used to mix the aqueous suspension $S_1$ of uranium(IV) oxalate particles with the aqueous suspension $S_2$ of plutonium(IV) oxalate particles, and for the near-simultaneous filtration of suspension $S_{1+2}$ obtained from this mixture in the example of embodiment of the method of the invention described below.

Mixing of the Aqueous Suspensions $S_1$ and $S_2$ and Separation of the Suspension $S_{1+2}$ into Two Phases:

These steps are performed using the assembly illustrated in FIG. 2.

As can be seen in this Figure, each of the aqueous suspensions $S_1$ and $S_2$ is conveyed by means of a line, respectively 25 and 26, in one of the branches of a Y-shaped connector 27, a third branch of which—wherein these aqueous suspensions are combined and intimately mixed together to form aqueous suspension $S_{1+2}$—has its end portion positioned just above a filtration system allowing this suspension to be separated into an aqueous phase (or filtrate) and a solid phase (or cake).

This filtration system is composed of a Büchner funnel 28, the bottom part of which is equipped with a filter (for example, a glass microfibre filter of Whatman™ GF/B filter type) on which the oxalate particles are retained, and a vacuum flask 29 which is placed underneath the funnel and in which the aqueous phase of suspension $S_{1+2}$ is collected.

The inlet flow rates of the aqueous suspensions $S_1$ and $S_2$ in the connector 27 are regulated by means of pumps, 30 and 31 respectively, each equipped with a flowmeter, these flow rates being 48.1 mL/min for the aqueous suspension $S_1$ and 39.9 mL/min for the aqueous suspension $S_2$.

Filtering of the aqueous suspension $S_{1+2}$ is performed without placing the flask 29 under a vacuum so that the oxalate particles are homogenously distributed over the filter. Once the maximum volume of the capacity of the Büchner funnel 28 is reached, the flask 29 is placed under a vacuum by means of a vacuum pump 32 to dewater the cake formed of oxalate particles.

Calcination of the Solid Phase:

The cake of oxalate particles previously obtained is calcined under flushing with air.

For doing that, the cake of particles is placed in an oven that is heated until its temperature reaches 700° C., with a rise of 20° C./minute. This temperature is maintained for 1 hour. Heating is then stopped and the cake of particles is left in the oven until the oven temperature returns to ambient temperature. The flow rate of the flushing gas is such that the volume of the oven is renewed 10 times with this gas throughout the calcination time.

At the end of this calcination, a powder composed of a mixture of $U_3O_8$ particles and $PuO_2$ particles is obtained.

2. Analyses:

Analyses of the Filtrate:

The filtrate obtained at the end of the filtering step was analysed to determine the metal cation composition thereof. Analyses showed that this filtrate comprises from 1 mg/L to 10 mg/L of uranium(IV), from 20 mg/L to 25 mg/L of plutonium(IV) and from 3 g to 4 g/L of uranium(VI).

This confirms that the chemical conditions of precipitation applied above to prepare the aqueous suspensions $S_1$ and $S_2$ allow near-quantitative precipitation of uranium(IV) and plutonium(IV). It is therefore possible, by controlling the flow rates at the mixing step of these suspensions, to find a Pu(IV)/U(IV)+Pu(IV) molar ratio in the cake of oxalate particles that is similar to the initial Pu(IV)/U(IV)+Pu(IV) molar ratio.

Also, the initial concentration of uranium(VI) in the aqueous solution $A'_1$ leads to finding the entirety of this uranium in the filtrate.

Analyses of the Oxalate Particles:

The aqueous suspensions $S_1$ and $S_2$ and the aqueous suspension $S_{1+2}$ were subjected to a laser particle size analysis (particle size analyser from MALVERN Instruments).

The Table below gives the values of the volume mean diameter, denoted D[4,3] and expressed in µm, obtained for the particles of oxalate(s) of these suspensions.

TABLE

| Particles | D[4,3] (μm) |
|---|---|
| $S_1$: uranium(IV) oxalate | 40-50 |
| $S_2$: plutonium(IV) oxalate | 40-50 |
| $S_{1+2}$: uranium(IV) oxalate + plutonium(IV) oxalate | 40-55 |

These particle size values, that are close to one another and centred around 45 μm, are comparable with those of particles of plutonium(IV) oxalate conventionally obtained in industrial units for the conversion of plutonium(IV) to oxalate.

Figure 3:
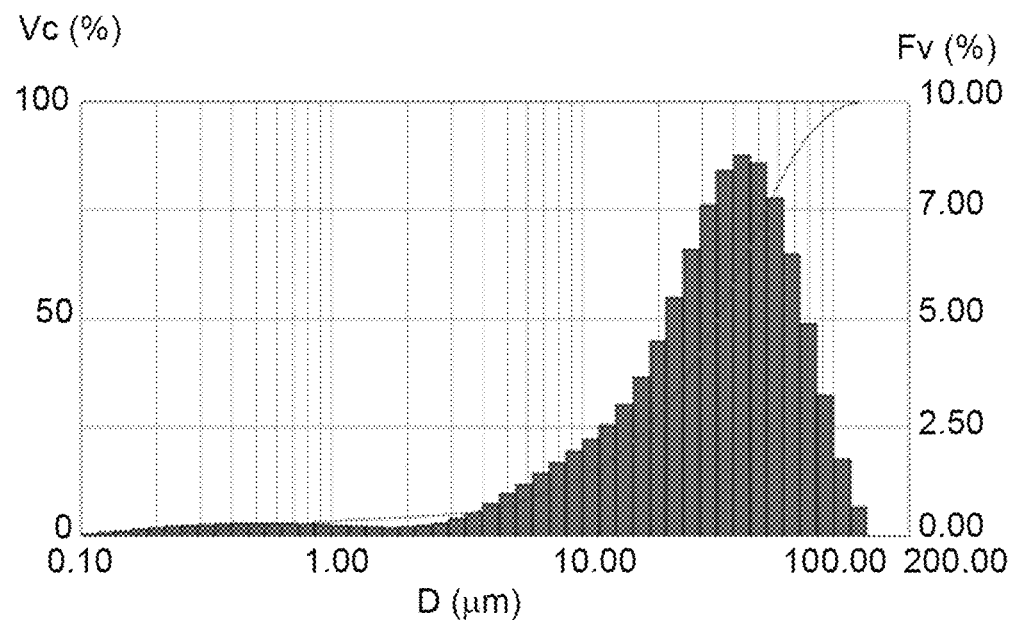
FIG. 3 illustrates the laser particle size distribution of particles of uranium(IV) oxalate and plutonium(IV) oxalate in the aqueous suspension $S_{1+2}$ obtained in the example of embodiment of the method of the invention described below; the diameter of the particles, denoted D and expressed in μm, is shown along the X-axis: the frequency in volume of the particles, denoted Fv and expressed in %, is given along the right Y-axis whilst the cumulative volume of the particles, denoted Vc and expressed in %, is given along the left Y-axis.

Also, FIG. 3 gives the particle size distribution obtained, also by laser particle size analysis, for the aqueous suspension $S_{1+2}$.

The aqueous suspensions $S_1$ and $S_2$ and the aqueous suspension $S_{1+2}$ were also subjected, but after filtering and dewatering, to X-ray diffraction analyses (BRUKER AXS diffractometer of θ-2θ configuration, equipped with a copper anti-cathode having a Kα radiation at a wavelength λ of 1.5418 Å, and with a linear type BRUKER AXS detector).

Figure 4A:
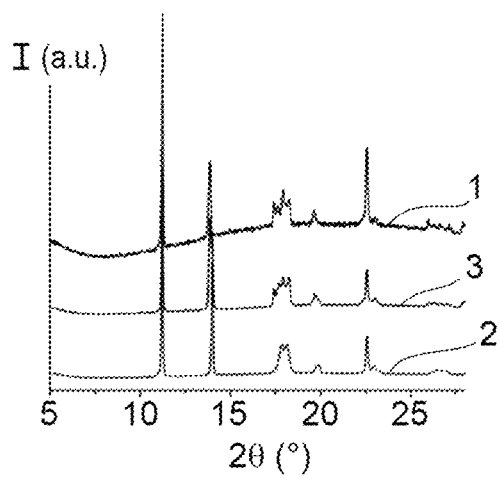
FIGS. 4A and 4B illustrate X-ray diffractograms of the oxalate particles of the aqueous suspensions $S_1$, $S_2$ and $S_{1+2}$ obtained in the example of embodiment of the method of the invention described below, after filtration and dewatering of these suspensions, FIG. 4B giving an enlargement of FIG. 4A at the peak located at $2\theta=14°$ in this Figure; in each of FIGS. 4A and 4B, the diffractogram denoted 1 corresponds to the particles of uranium(IV) oxalate in the aqueous suspension $S_1$, the diffractogram denoted 2 corresponds to the particles of plutonium(IV) oxalate in the aqueous suspension $S_2$ whilst the diffractogram denoted 3 corresponds to the particles of uranium(IV) oxalate and plutonium(IV) oxalate in the aqueous suspension $S_{1+2}$.
Figure 4B:
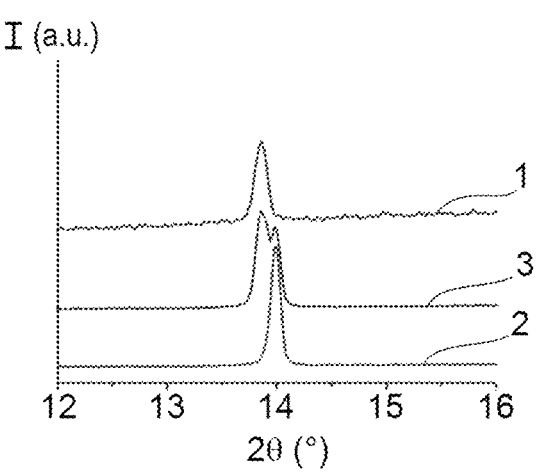

The X-ray diffractograms so obtained are illustrated in FIG. 4A and in FIG. 4B which corresponds to an enlargement of FIG. 4A at the peak positioned at 2θ=14° in FIG. 4A.

As shown in these Figures in which diffractogram 1 corresponds to the aqueous suspension $S_1$, diffractogram 2 corresponds to the aqueous suspension $S_2$ whilst diffractogram 3 corresponds to the aqueous suspension $S_{1+2}$, the two oxalate phases of the aqueous suspension $S_{1+2}$ crystallize in one same structure of monoclinic type $An(C_2O_4)_2 \cdot 6H_2O$.

This crystallization form has the advantage of only retaining a weight fraction of water of the order of 15% in the filter cake, thereby imparting a scarcely tacky nature to the mixture of uranium(IV) oxalate particles and plutonium(IV) oxalate particles forming this cake.

The absence is noted in diffractograms 2 and 3 of any peaks which could correspond to uranium(VI) oxalate.

Figure 5:
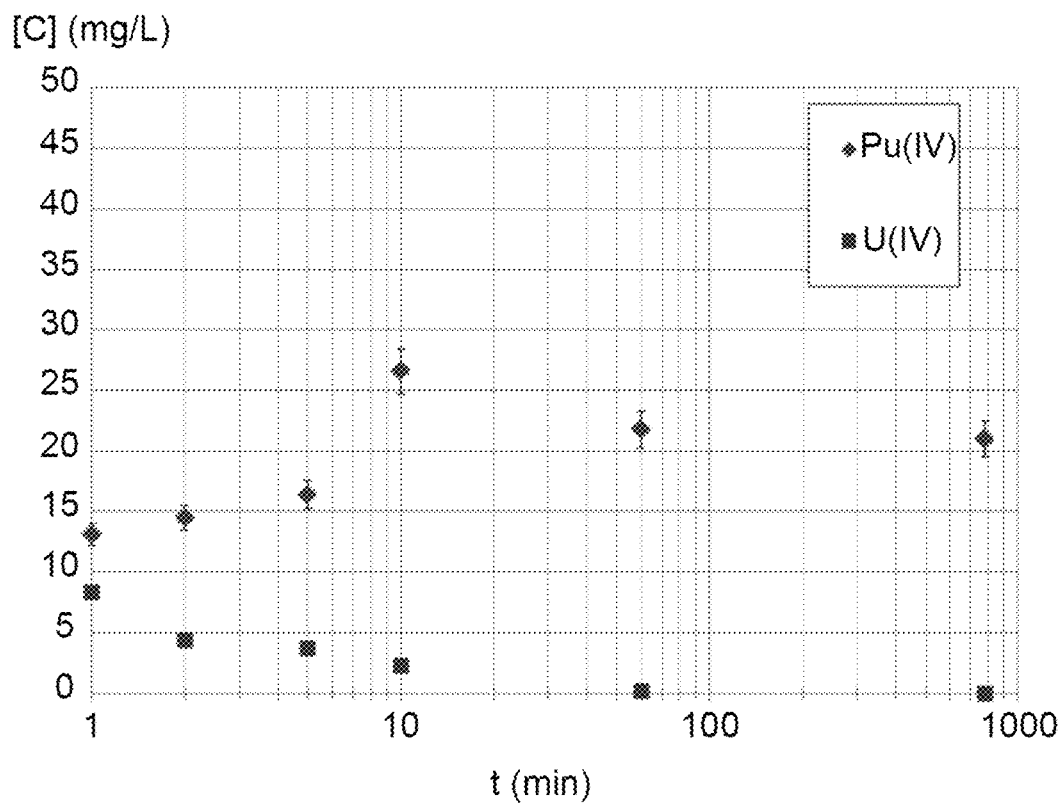
FIG. 5 illustrates the changes in time, denoted t and expressed in minutes on a logarithmic scale, of the concentrations of uranium(IV) and plutonium(IV), denoted [C] and expressed in mg/L, of a sample of the aqueous suspension $S_{1+2}$ obtained in the example of embodiment of the method of the invention described below that was left to age for 15 hours.

As indicated in the foregoing, uranium(IV) is a powerful reductant of plutonium(IV). By preparing the aqueous suspensions of uranium(IV) oxalate particles and plutonium(IV) oxalate particles separately, it is possible to annihilate the redox effect in aqueous phase when these particles of oxalates are later mixed with each other. This is demonstrated in FIG. 5 which shows that the measurement of the concentrations of uranium(IV) and plutonium(IV) in a sample of the suspension $S_{1+2}$, that was left to age for 15 hours, does not allow the detection of any phenomenon that would place in doubt the chemical stability of these particles.

Figure 6:
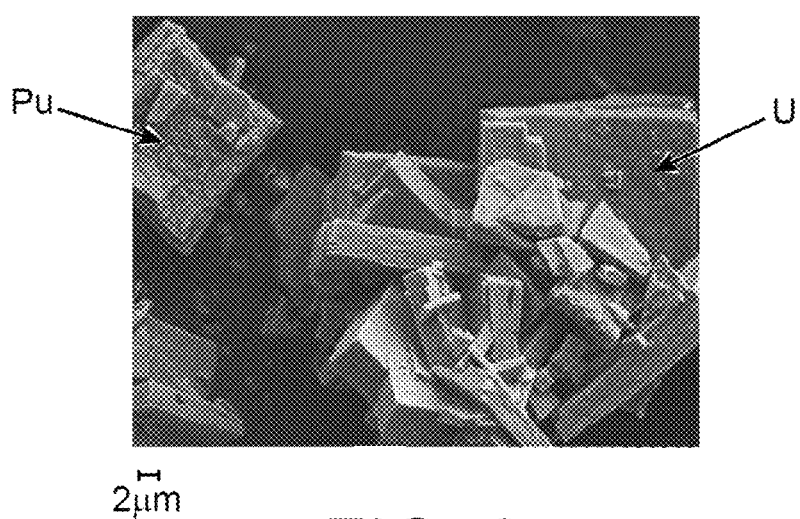
FIG. 6 gives a photograph of the aqueous suspension $S_{1+2}$ obtained in the example of embodiment of the method of the invention described below, taken under scanning electron microscope (SEM) after filtering and dewatering this suspension.

In addition, as shown in FIG. 6, which corresponds to a photograph of the filter cake of the aqueous suspension $S_{1+2}$ taken under SEM in secondary electron mode (ZEISS field effect electron microscope associated with an EDS detector and WDS detector), the distribution of the uranium(IV) oxalate particles and plutonium(IV) oxalate particles in this cake is homogeneous.

Analysis of the Oxide Particles:

The powder obtained at the end of the calcination step was subjected to analyses to evaluate its BET specific surface area, its particle size distribution (by laser particle size analysis), its composition (by X-ray diffraction) and its homogeneity (by SEM).

The laser particle size, X-ray diffraction and SEM analyses were conducted using the same equipments as indicated previously.

Figure 7:
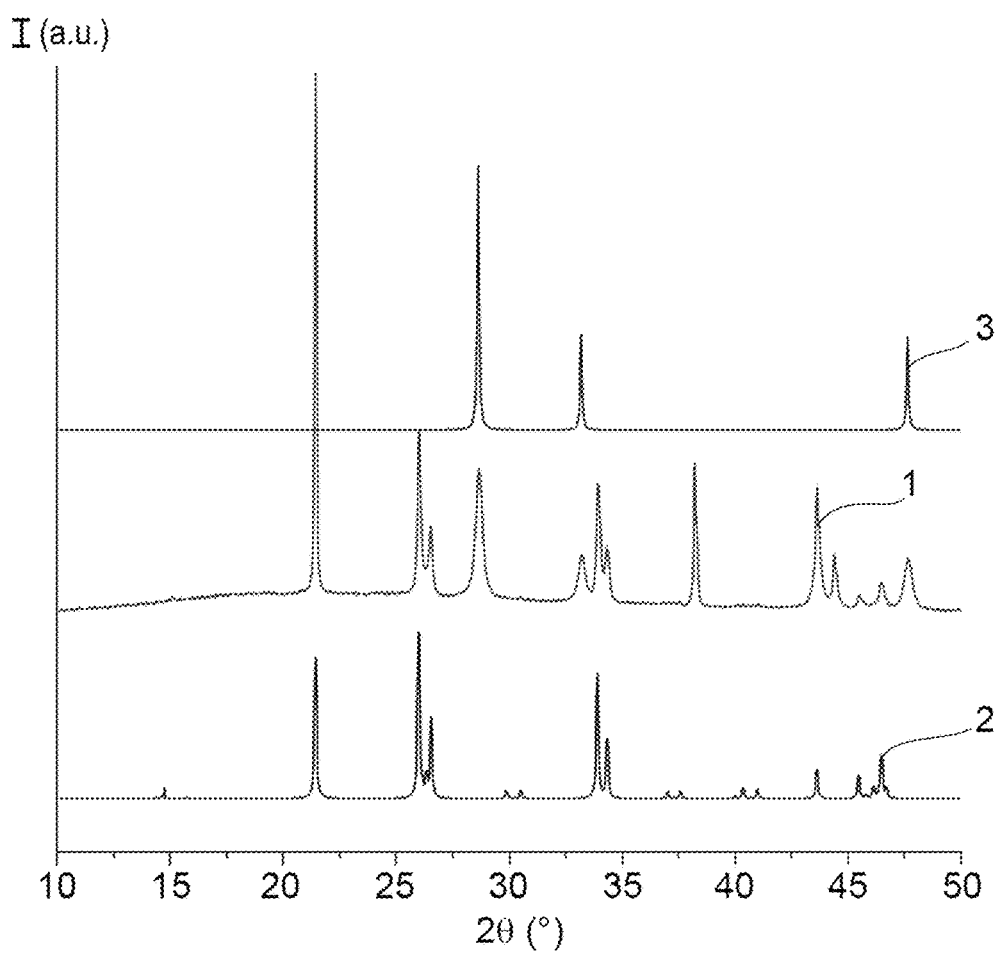
FIG. 7 gives an X-ray diffractogram, denoted 1, of the powder of triuranium octoxide and plutonium dioxide obtained in the example of embodiment of the method of the invention described below; for comparison, this Figure also gives the computed diffractogram for particles of triuranium octoxide denoted 2, and the computed diffractogram for particles of plutonium dioxide denoted 3.
Figure 8:
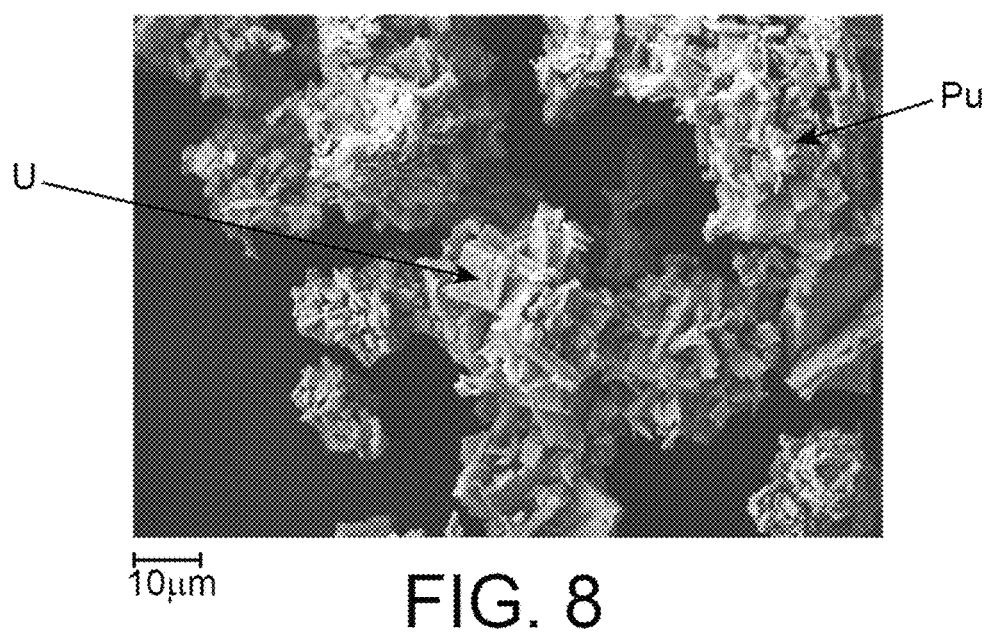
FIG. 8 is a photograph of the powder of triuranium octoxide and plutonium dioxide obtained in the example of embodiment of the method of the invention described below, taken under SEM.

These analyses showed that the powder:
- has a specific surface area of about 3 $m^2/g$;
- has a volume mean diameter D[4,3] of about 15 μm;
- is exclusively composed of $U_3O_8$ and $PuO_2$, as illustrated in FIG. 7 which shows both the X-ray diffractogram, denoted 1, of said powder and the computed diffractograms for particles of triuranium octoxide and particles of plutonium dioxide, respectively denoted 2 and 3; and
- exhibits a homogeneity between the $U_3O_8$ and $PuO_2$ phases conforming to that obtained before calcinations for the phases of uranium(IV) oxalate and plutonium(IV) oxalate in the filter cake of the aqueous suspension $S_{1+2}$, as illustrated by the SEM photograph in FIG. 8.

CITED REFERENCES

[1] WO-A-2007/135178
[2] Numao et al., GLOBAL 2007: Advanced Nuclear Fuel Cycles and Systems, Boise, USA, 9-13 Sep. 2007
[3] Felker et al., ATALANTE 2008: Nuclear Fuel Cycles for a Sustainable Future, Montpellier, France, 19-23 May 2008
[4] WO-A-02/28778
[5] WO-A-2005/119699
[6] Delegard et al., PNNL-13934, 2002
[7] Atlas et al., *Journal of Nuclear Materials*, 2001, 294, 344-348
[8] WO-A-2010/070064

What is claimed is:

1. A method for preparing a powder comprising particles of triuranium octoxide and particles of plutonium dioxide, comprising the steps of:
   a) preparing, by oxalic precipitations, an aqueous suspension $S_1$ of particles of uranium(IV) oxalate and an aqueous suspension $S_2$ of particles of plutonium(IV) oxalate;
   b) mixing the aqueous suspension $S_1$ with the aqueous suspension $S_2$ to obtain an aqueous suspension $S_{1+2}$ comprising particles of uranium(IV) oxalate and particles of plutonium(IV) oxalate;
   c) separating the aqueous suspension $S_{1+2}$ into an aqueous phase and a solid phase, the solid phase comprising the particles of uranium(IV) oxalate and the particles of plutonium(IV) oxalate; and
   d) calcining the solid phase to convert (1) the particles of uranium(IV) oxalate to particles of triuranium octoxide and (2) the particles of plutonium(IV) oxalate to the particles of plutonium(IV) dioxide, whereby the powder is obtained;
   and wherein steps b) and c) are performed simultaneously or successively.

2. The method of claim 1, wherein step a) comprises:
   placing an aqueous solution $A_1$ comprising nitric acid and uranium(IV) nitrate in contact with an aqueous solution $A_2$ comprising a first precipitating agent to form a first reaction medium in which uranium(IV) is precipitated in a form of uranium(IV) oxalate, the first precipitating agent being oxalic acid, a salt or an alkylated derivative thereof; and
   placing an aqueous solution $A'_1$ comprising nitric acid and plutonium(IV) nitrate in contact with an aqueous solution $A'_2$ comprising a second precipitating agent to form a second reaction medium in which plutonium (IV) is precipitated in a form of plutonium(IV) oxalate, the second precipitating agent being oxalic acid, a salt or an alkylated derivative thereof.

3. The method of claim 2, wherein a concentration of nitric acid in the aqueous solutions $A_1$ and $A'_1$ is between 0.5 mol/L and 5 mol/L.

4. The method of claim 2, wherein a concentration of the uranium(IV) nitrate in the aqueous solution $A_1$ and a concentration of plutonium(IV) nitrate in the aqueous solution $A'_1$ are between 0.001 mol/L and 1 mol/L.

5. The method of claim 2, wherein a concentration of the first precipitating agent in the aqueous solutions $A_2$ and a concentration of the second precipitating agent $A'_2$ are between 0.05 mol/L and 1 mol/L.

6. The method of claim 2, wherein the first precipitating agent is present in the first reaction medium in excess with regard to stoichiometric conditions for an oxalic precipitation of uranium(IV) and the second precipitating agent is present in the second reaction medium in excess with regard to stoichiometric conditions for an oxalic precipitation of plutonium(IV).

7. The method of claim 2, wherein the aqueous solution A'1 further comprises uranium(VI) nitrate.

8. The method of claim 1, wherein step c) comprises a vacuum or pressure filtration of the aqueous suspension $S_{1+2}$.

9. The method of claim 1, wherein steps b) and c) are performed simultaneously.

10. The method of claim 1, wherein step d) comprises a treatment of the solid phase at a temperature of at least 550° C. and in an oxidizing atmosphere.

11. The method of claim 1, wherein the powder further comprises particles of an actinide(IV) dioxide, the actinide (IV) dioxide being thorium dioxide or neptunium dioxide, and wherein the method further comprises the steps of:
   a') preparing, by oxalic precipitations, the aqueous suspension $S_1$ of particles of uranium(IV) oxalate, the aqueous suspension $S_2$ of particles of plutonium(IV) oxalate and an aqueous suspension $S_3$ of particles of actinide(IV) oxalate;
   b') mixing the aqueous suspensions $S_1$, $S_2$ and $S_3$ with each other to obtain an aqueous suspension $S_{1+2+3}$ comprising the particles of uranium(IV) oxalate, the particles of plutonium(IV) oxalate and the particles of actinide(IV) oxalate;
   c') separating the aqueous suspension $S_{1+2+3}$ into an aqueous phase and a solid phase, the solid phase being formed by the particles of uranium(IV) oxalate, the particles of plutonium(IV) oxalate and the particles of actinide(IV) oxalate; and
   d') calcining the solid phase to convert (1) the particles of uranium(IV) oxalate to the particles of triuranium octoxide, (2) the particles of plutonium(IV) oxalate to the particles of plutonium dioxide, and (3) the particles of actinide(IV) oxalate to the particles of actinide(IV) dioxide, whereby the powder is obtained;
   and wherein steps b') and c') are performed simultaneously or successively.

12. The method of claim 1, wherein the powder further comprises particles of an actinide(IV) dioxide, the actinide (IV) dioxide being thorium dioxide or neptunium dioxide, and the method comprises the steps of:
   a") preparing, by oxalic precipitations, an aqueous suspension $S_1$ of particles of uranium(IV) and actinide(IV) double oxalate, and the aqueous suspension $S_2$ of particles of plutonium(IV) oxalate;
   b") mixing the aqueous suspension $S_1$ with the aqueous suspension $S_2$ to obtain an aqueous suspension $S_{1+2}$ comprising particles of uranium(IV) and actinide(IV) double oxalate and particles of plutonium(IV) oxalate;
   c") separating the aqueous suspension $S_{1+2}$ into an aqueous phase and a solid phase, the solid phase being formed by the particles of uranium(IV) and actinide (IV) double oxalate and the particles of plutonium(IV) oxalate; and
   d") calcining the solid phase to convert (1) the particles of uranium(IV) and actinide(IV) double oxalate to the particles of triuranium octoxide and actinide(IV) dioxide, and (2) the particles of plutonium(IV) oxalate to the particles of plutonium dioxide, whereby the powder is obtained;
   and wherein steps b") and c") are performed simultaneously or successively.

* * * * *